United States Patent
Gauthier et al.

(10) Patent No.: US 7,426,435 B2
(45) Date of Patent: Sep. 16, 2008

(54) ENGINE CONTROL SYSTEM AND METHOD

(75) Inventors: Greg Gauthier, Dearborn, MI (US); John Proietty, Ferndale, MI (US); Fazal Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/534,018

(22) Filed: Sep. 21, 2006

(65) Prior Publication Data

US 2008/0077311 A1 Mar. 27, 2008

(51) Int. Cl.
G06G 7/76 (2006.01)
B06T 7/16 (2006.01)

(52) U.S. Cl. .................................. 701/112; 701/117

(58) Field of Classification Search ............... 701/102, 701/112, 93, 96, 97, 166, 167, 300, 301; 180/333, 170, 232, 271; 340/411, 435, 436, 340/903; 318/568.1, 570, 571, 587; 123/352
See application file for complete search history.

(56) References Cited

U.S. PATENT DOCUMENTS

| | | | |
|---|---|---|---|
| 5,432,509 A * | 7/1995 | Kajiwara | 340/903 |
| 6,032,646 A * | 3/2000 | Minowa et al. | 123/396 |
| 6,332,108 B1 * | 12/2001 | Hirasago | 701/93 |
| 6,415,230 B1 * | 7/2002 | Maruko et al. | 701/301 |
| 6,487,477 B1 | 11/2002 | Woestman et al. | |
| 6,554,088 B2 | 4/2003 | Severinsky et al. | |
| 6,571,165 B2 * | 5/2003 | Maruko et al. | 701/93 |
| 6,604,042 B2 * | 8/2003 | Maruko et al. | 701/96 |
| 7,020,553 B2 * | 3/2006 | Nakamura et al. | 701/50 |
| 2005/0228553 A1 * | 10/2005 | Tryon | 701/22 |
| 2006/0036357 A1 | 2/2006 | Isono et al. | |
| 2007/0067079 A1 * | 3/2007 | Kosugi | 701/35 |

FOREIGN PATENT DOCUMENTS

WO   2005007444 A1   1/2005

* cited by examiner

*Primary Examiner*—Willis R. Wolfe, Jr.
*Assistant Examiner*—Johnny H. Hoang
(74) *Attorney, Agent, or Firm*—David B. Kelley; Brooks Kushman P.C.

(57) ABSTRACT

A vehicle engine is controlled based on a distance between the vehicle and an object other than the vehicle. In at least one embodiment, a system for controlling an engine in a vehicle is provided. The system includes an environment sensor arrangement configured to sense a distance between the vehicle and an object other than the vehicle and an operating sensor arrangement configured to sense an operating state of the vehicle. The system also includes a control module configured to determine whether to start or stop the engine based on the distance and the operating state.

20 Claims, 7 Drawing Sheets

| Vehicle Speed | Distance | DD Power | Engine Start/Stop Request |
|---|---|---|---|
| Low | Small | Low Positive | Stop |
| Low | Small | Medium Positive | Stop |
| Low | Small | High Positive | Stop |
| Low | Small | Low Negative | Stop |
| Low | Small | Medium Negative | Stop |
| Low | Small | High Negative | Stop |
| Low | Medium | Low Positive | Stop |

○ ○
○ ○
○ ○

| Medium | Medium | High Negative | Start |
|---|---|---|---|
| Medium | Large | Low Positive | Start |
| Medium | Large | Medium Positive | Start |
| Medium | Large | High Positive | Start |
| Medium | Large | Low Negative | Start |
| Medium | Large | Medium Negative | Start |
| Medium | Large | High Negative | Start |

○ ○
○ ○
○ ○

| High | Medium | High Negative | Start |
|---|---|---|---|
| High | Large | Low Positive | Start |
| High | Large | Medium Positive | Start |
| High | Large | High Positive | Start |
| High | Large | Low Negative | Start |
| High | Large | Medium Negative | Start |
| High | Large | High Negative | Start |

Fig. 3

|  | Term | Range |
|---|---|---|
| Vehicle Speed | Low | 0 to 20 mph |
|  | Mediuim | 21 to 35 mph |
|  | High | ≥ 36 mph |
| Distance | Small | 0 to 10 ft. |
|  | Medium | 11 to 20 ft. |
|  | Large | 21 ft. |
| DD Power | Low Positive | 0 to 9 kw |
|  | Medium Positive | 10 to 40 kw |
|  | High Positive | ≥ 41 kw |
|  | Low Negative | 0 to -9 kw |
|  | Medium Negative | -10 to -40 kw |
|  | High Negative | ≤ - 41kw |

Fig. 4

ENGINE CONTROL SYSTEM AND METHOD

BACKGROUND OF THE INVENTION

1. Field of the Invention

The invention relates to engine control systems and methods.

2. Background Discussion

Determining whether to start or stop an engine of an alternatively powered vehicle, such as a hybrid electric vehicle, may affect the fuel economy and undesirable exhaust gas emissions of the vehicle. Frequently starting and stopping the engine during heavy traffic conditions, for example, may decrease the vehicle's fuel economy and increase the vehicle's emissions.

Determining whether to start or stop an engine may be based on driver input. If, for example, the vehicle's accelerator pedal position exceeds a threshold, the engine may be started. Further, if the vehicle's brake pedal position exceeds a threshold, the engine may be stopped. In traffic conditions characterized by frequent vehicle starts and stops, determining whether to start or stop the engine based on driver input may result in frequent starting and stopping of the engine.

Determining whether to start or stop an engine may be based on a vehicle's speed. If, for example, the vehicle's speed is 5 miles per hour (mph) or faster, the engine may be started. Further, if the vehicle's speed is less than 5 mph, the engine may be stopped. In traffic conditions characterized by frequent vehicle starts and stops, determining whether to start or stop the engine based on speed may result in frequent starting and stopping of the engine.

An engine control system and method is desired that would regulate engine stop and start requests in real time to optimize engine performance based on an indicator of traffic conditions.

SUMMARY OF THE INVENTION

In at least one embodiment, the invention takes the form of a system for controlling an engine in a vehicle. The system includes an environment sensor arrangement located on the vehicle and configured to sense a distance between the vehicle and an object other than the vehicle. The system also includes an operating sensor arrangement configured to sense an operating state of the vehicle. The system further includes a control module configured to determine whether to start or stop the engine based on the distance and the operating state.

In at least one embodiment, the invention takes the form of a method for controlling an engine in a vehicle. The method includes determining a distance between the vehicle and an object other than the vehicle. The method also includes determining an operating state of the vehicle. The method further includes requesting the engine to start or stop based on the distance and the operating state.

In at least one embodiment, the invention takes the form of a system for controlling an engine in a vehicle. The system includes an environment sensor arrangement located on the vehicle and configured to sense a distance between the vehicle and an object other than the vehicle. The system also includes a control module configured to determine whether to start or stop the engine based on the distance.

In at least one embodiment, the invention takes the form of a method for optimizing the fuel economy and reducing the emissions of an alternatively powered vehicle by detecting traffic conditions using a Near Object Detection System or other distance indicating device. The method regulates engine stop/start requests using Boolean or Fuzzy logic based on the traffic conditions.

BRIEF DESCRIPTION OF THE DRAWINGS

FIG. 3 shows example data used in practicing the invention.

FIG. 4 shows example data used in practicing the invention.

DETAILED DESCRIPTION OF EMBODIMENTS OF THE INVENTION

Figure 1:
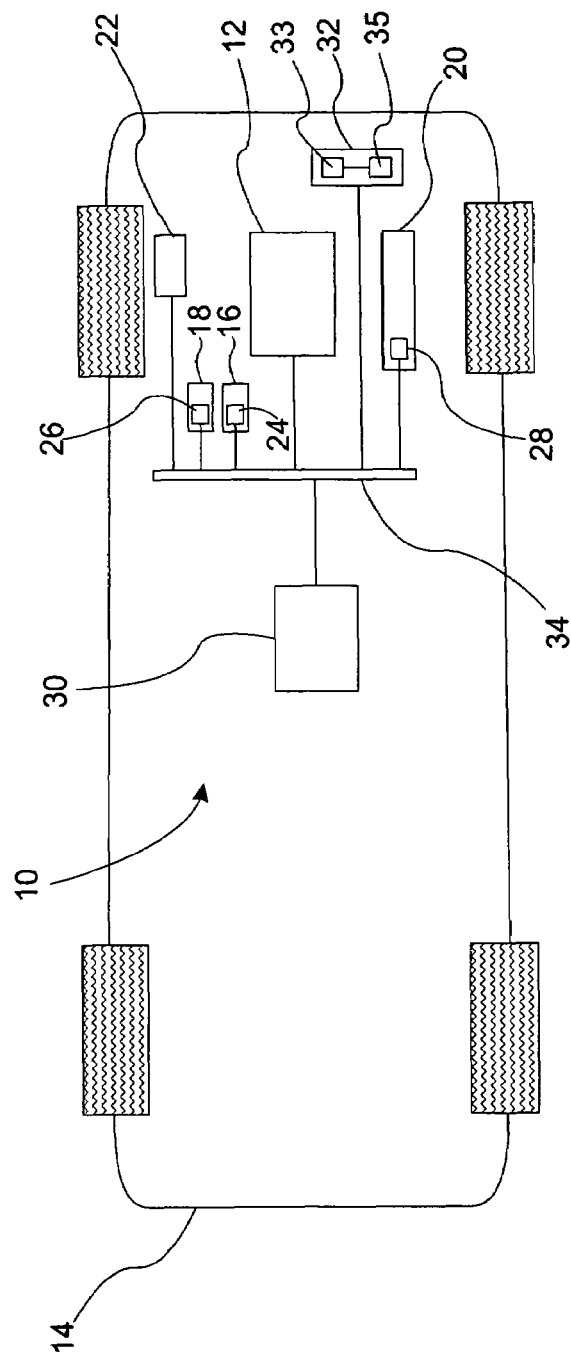
FIG. 1 shows an engine control system in accordance with an embodiment of the invention.

FIG. 1 shows system 10 for controlling engine 12 in vehicle 14. Vehicle 14 includes accelerator pedal 16, brake pedal 18, and power storage system 20, e.g., high voltage battery. System 10 includes vehicle speed sensor 22 for sensing the vehicle's speed, accelerator pedal sensor 24 for sensing a position of accelerator pedal 16, and brake pedal sensor 26 for sensing a position of brake pedal 18. System 10 also includes state of charge sensor 28, e.g., hall effect sensor, for sensing a state of charge of power storage system 20, control module 30, e.g., powertrain control module, and environment sensor arrangement 32 for sensing the distance between vehicle 14 and an object other than vehicle 14.

Control module 30 may comprise one or more controllers located in vehicle 14. Control module 30 and sensors 22, 24, 26, 28, and 32 communicate via data bus 34 using, for example, the Controller Area Network (CAN) protocol.

Control module 30 may determine an acceleration of accelerator pedal 16 based on the rate of change of accelerator pedal position over time. Similarly, control module 30 may determine an acceleration of brake pedal 18 based on the rate of change of brake pedal position over time.

In system 10 of FIG. 1, environment sensor arrangement 32 includes a near object detection system (NODS). The NODS includes radio frequency transceiver 33 in communication with microcontroller 35. Transceiver 33 transmits a radio frequency signal and upon receiving a response signal reflected by an object in front of vehicle 14, microcontroller 35 determines the distance between vehicle 14 and the object using the Doppler effect. The NODS then broadcasts this information to control module 30 via bus 34. Environment sensor arrangement 32, however, may use any suitable technology, such as infrared, laser, or ultrasound, to detect the distance between vehicle 14 and an object other than vehicle 14.

The operating state information from sensors 22, 24, 26, and 28 alone or in some combination may be used by control module 30 to determine an operating state of vehicle 14. For example, brake pedal position, accelerator pedal position, and vehicle speed may be used by control module 30 to determine a driver demand for power/torque (DD Power) via a look up table. Values for DD Power for given values of brake pedal position, accelerator pedal position, and vehicle speed may be determined in any suitable manner including via testing or computer modeling. Accelerator pedal position, by itself, may be used to determine DD Power, e.g., if the position of accelerator pedal 16 exceeds a predetermined threshold, then DD Power is equal to 3 kilowatts (kw). Similarly, acceleration information regarding pedals 16, 18 may be used to determine DD Power.

DD Power may be positive or negative. For example, if a driver is pressing accelerator pedal 16, DD Power is positive. If a driver is pressing brake pedal 18, DD Power is negative.

Figure 2:
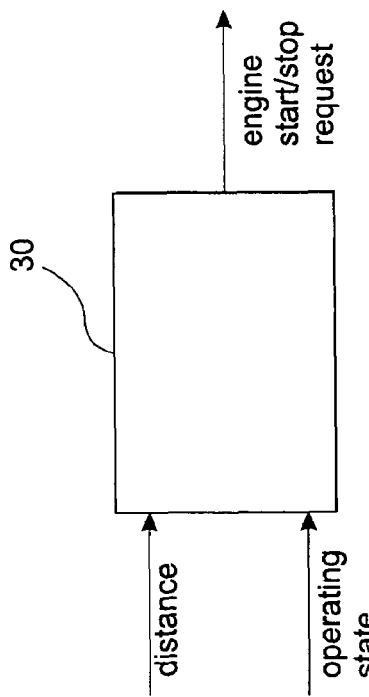
FIG. 2 shows a control module in accordance with an embodiment of the invention.

FIG. 2 shows that the information, i.e., inputs, regarding the distance between vehicle 14 and an object other than vehicle 14 and the operating states of vehicle 14, e.g., DD Power and vehicle speed, are used by control module 30 to determine whether to issue a start or stop request, i.e., output, for engine 12.

Control module 30 may use Boolean logic to determine whether to start or stop engine 12. FIG. 3 shows an example set of rules implementing such logic. If vehicle speed is "Low," distance is "Small," and DD Power is "Low Positive," according to rule 40, control module 30 will issue a "Stop" request for engine 12.

The terms used in FIG. 3, e.g., "Low," "Small," "High Negative," describe numerical ranges for the distance and operating states. The ranges associated with these terms will depend on the application. FIG. 4 shows example ranges associated with the terms of FIG. 3. The rules of FIG. 3 and the ranges of FIG. 4 may be embodied in look up tables.

Control module 30 may use fuzzy techniques, e.g., Multiple Input Single Output Singleton Mamdami Fuzzy Control, to determine whether to start or stop engine 12. the defuzzier $$U(n) = K_u \frac{\sum_{j=1}^{\Omega} \mu_j^{\alpha}(x, \tilde{A}) \cdot h(I_{1,j}, \ldots, I_{M,j})}{\sum_{j=1}^{\Omega} \mu_j^{\alpha}(x, \tilde{A})}$$

where
- $\tilde{A}$: is a vector involving all the input fuzzy sets,
- $\mu_j^{\alpha}$: is the combined membership value from the antecedent of the jth rule, and represents the output fuzzy sets.
  Note: Using the generalized defuzzifier, alpha is a design parameter with a value of 1.

Any suitable defuzzier, however, may be used.

Figure 5A:
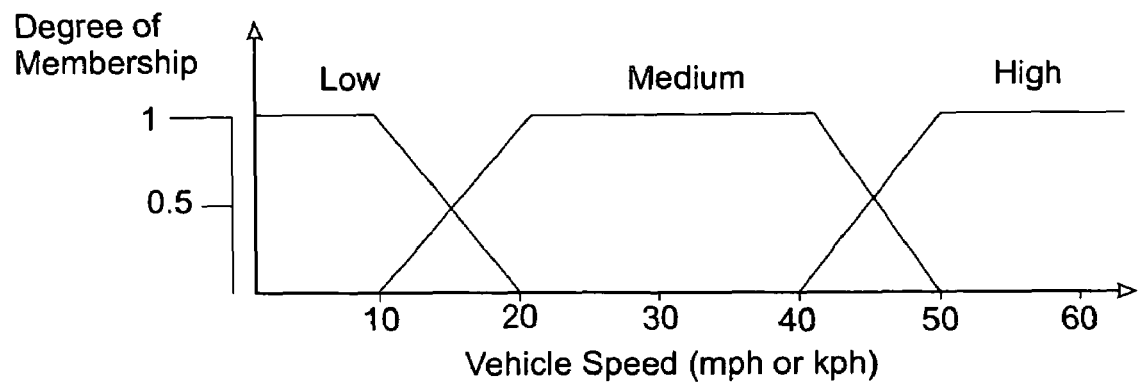
FIGS. 5*a*-5*c* show example input membership functions used in practicing the invention.
Figure 5B:
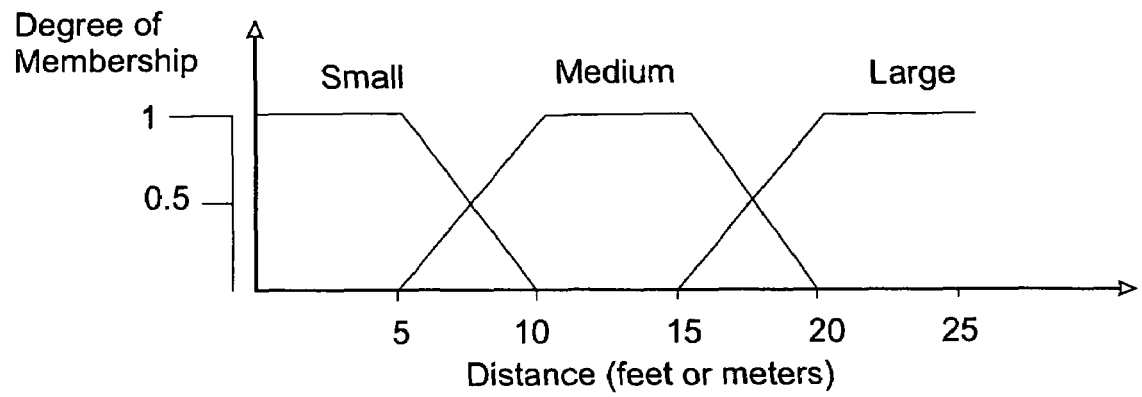
Figure 5C:
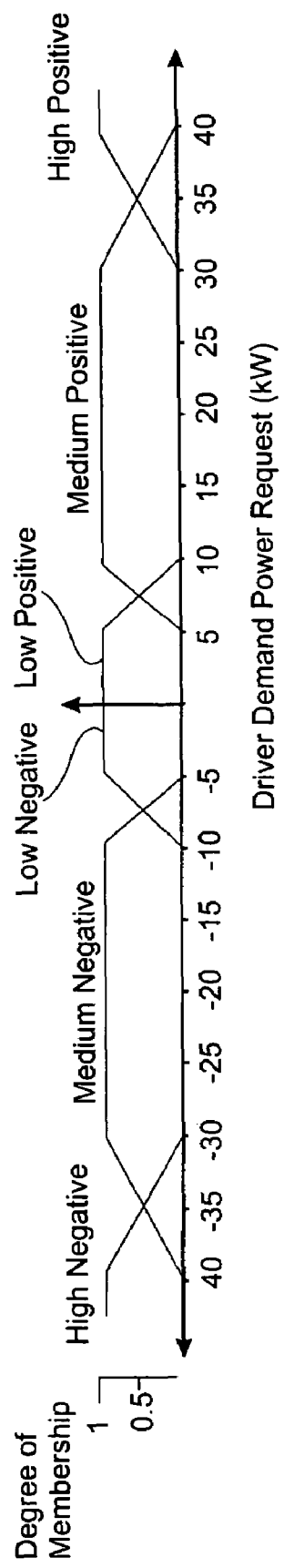

FIGS. 5a-5c show an example set of input membership functions associated with the distance and operating states, e.g., DD Power and vehicle speed. These membership functions are defined by a range of values and a degree of membership. The horizontal axis of the membership function represents the range of the membership function. The vertical axis represents the normalized value from 0 to 1.

The input membership functions of FIGS. 5a-5c are trapezoidal, however, any suitable membership function, such as triangular or Gaussian, may be used. In the example of FIGS. 5a-5c, each input will have a degree of membership between 0 and 1 within each input membership function. For example, if the vehicle speed is 15 mph, the vehicle speed will have a degree of membership of 0.5 in "Low," a degree of membership of 0.5 in "Medium," and a degree of membership of 0 in "High." If the distance is 5 feet, the distance will have a degree of membership of 1 in "Small" and 0 in all others. If the driver's demand for power is 0.5 kilowatts (kW), the driver's demand for power will have a degree of membership of 1 in "Low Positive" and 0 in all others. The membership functions may be embodied in look up tables or mathematical equations.

Figure 6:
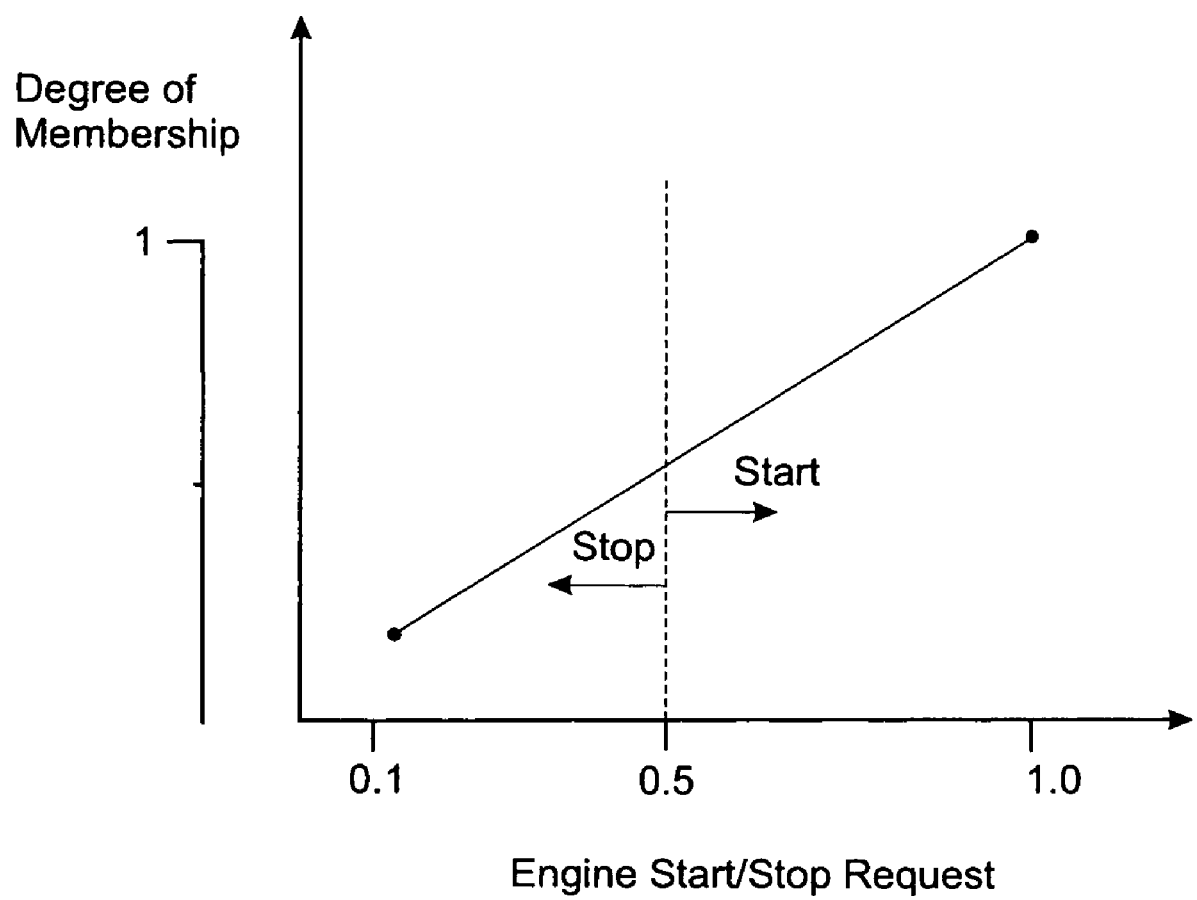
FIG. 6 shows an example output membership function used in practicing the invention.

FIG. 6 shows an example output membership function for a start/stop request. Whether the start/stop request has a value of 0.1 or 1 depends on rules, such as those shown in FIG. 3, used in implementing the fuzzy logic. Using the values from the example of FIGS. 5a-5c, rules 40, 42 are implicated. As such, for rule 40, the start/stop request has a value of 0.1 and for rule 42, the start/stop request has a value of 0.1.

Controller 30 may use Singleton Mamdami Fuzzy Control techniques to evaluate the defuzzier as explained above. As shown in FIG. 6, if the output of the defuzzier is less than 0.5, controller 30 issues a stop request for engine 12. If the output of the defuzzier is greater than 0.5, controller 30 issues a start request for engine 12. If the output of the defuzzier is equal 0.5, controller 30 does not issue a start or stop request, thereby allowing the engine to continue in its current state.

A range of values for the output of the defuzzier may be defined in which controller 30 does not issue a start or stop request. For example, if the output of the defuzzier is greater than 0.3 but less than 0.7, controller 30 does not issues a start or stop request.

Figure 7:
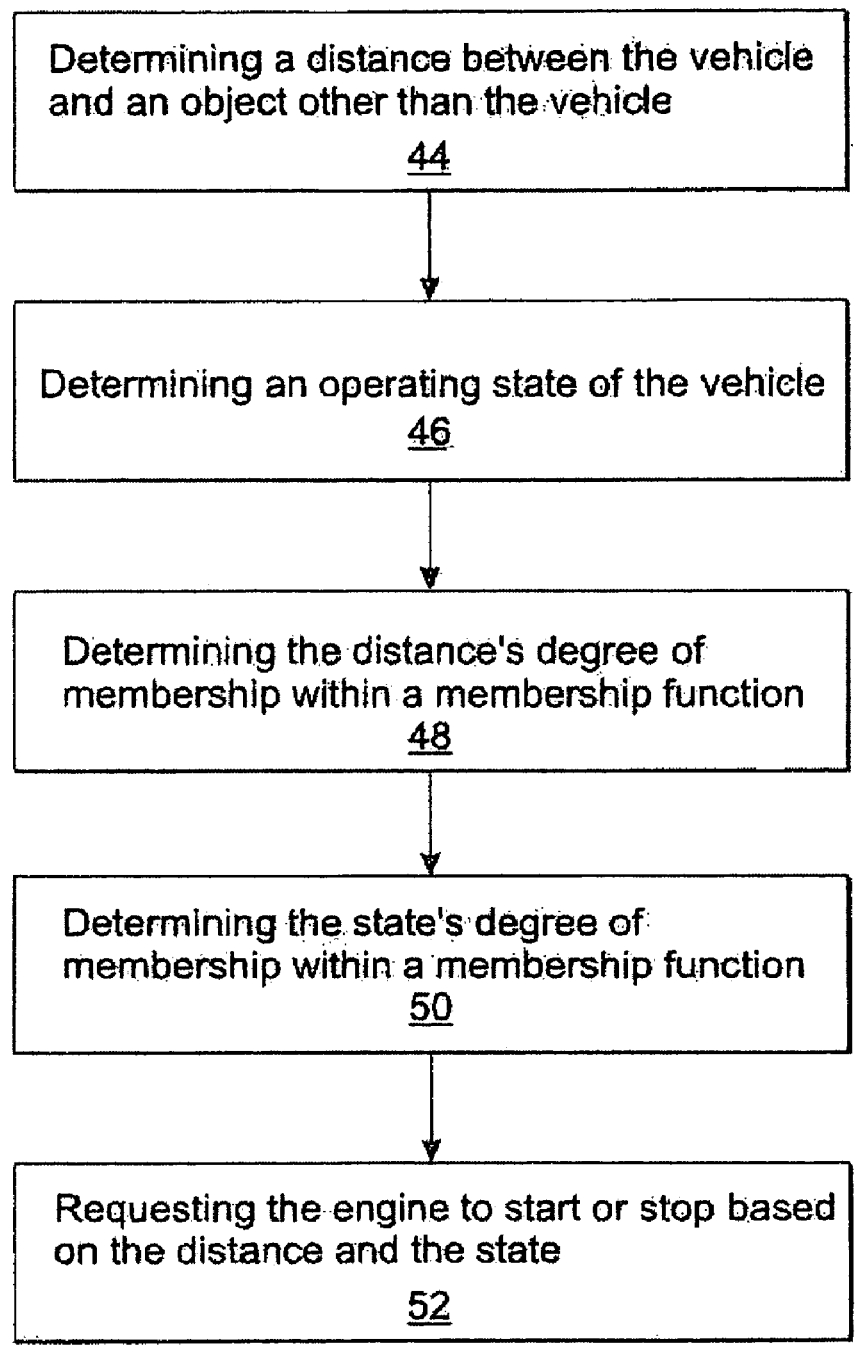
FIG. 7 shows a flow chart illustrating an algorithm used in practicing the invention.

FIG. 7 shows steps of a method for controlling an engine in a vehicle. At step 44, a distance between the vehicle and an object other than the vehicle is determined. At step 46, an operating state of the vehicle is determined. At step 48, the distance's degree of membership within a membership function is determined. At step 50, the state's degree of membership within a membership function is determined. At step 52, a request to start or stop the engine is made based on the distance and the state.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system for controlling an engine in a vehicle comprising:
   - an environment sensor arrangement located on the vehicle and configured to sense a distance between the vehicle and an object other than the vehicle;
   - an operating sensor arrangement configured to sense an operating state of the vehicle; and
   - a control module configured to determine whether to start or stop the engine based on the distance and the operating state.

2. The system of claim 1 wherein the control module uses fuzzy logic to determine whether to start or stop the engine.

3. The system of claim 1 wherein the environment sensor arrangement includes a near object detection system.

4. The system of claim 1 wherein the operating sensor arrangement includes a vehicle speed sensor configured to sense vehicle speed.

5. The system of claim 1 wherein the vehicle further includes an accelerator pedal, and wherein the operating sensor arrangement includes an accelerator pedal sensor configured to sense a position of the accelerator pedal.

6. The system of claim 5 wherein the control module is further configured to determine an acceleration of the accelerator pedal.

7. The system of claim 1 wherein the vehicle further includes a power storage system, and wherein the operating sensor arrangement includes a state of charge sensor configured to sense a state of charge of the power storage system.

8. The system of claim 1 wherein the vehicle further includes a brake pedal, and wherein the operating sensor arrangement includes a brake pedal sensor configured to sense a position of the brake pedal.

9. The system of claim 8 wherein the control module is further configured to determine an acceleration of the brake pedal.

10. A method for controlling an engine in a vehicle comprising:
    determining a distance between the vehicle and an object other than the vehicle;
    determining an operating state of the vehicle;
    requesting the engine to start or stop based on the distance and the operating state.

11. The method of claim 10 further comprising determining the distance's degree of membership within a membership function.

12. The method of claim 10 further comprising determining the state's degree of membership within a membership function.

13. The method of claim 10 wherein a near object detection system determines the distance between the vehicle and an object other than the vehicle.

14. The method of claim 10 wherein the state comprises a state of charge of a power storage system.

15. The method of claim 10 wherein the state comprises the vehicle's speed.

16. The method of claim 10 wherein the state comprises a driver demand for power.

17. A system for controlling an engine in a vehicle comprising:
    an environment sensor arrangement located on the vehicle and configured to sense a distance between the vehicle and an object other than the vehicle; and
    a control module configured to determine whether to start or stop the engine based on the distance.

18. The system of claim 17 wherein the environment sensor arrangement includes a near object detection system.

19. The system of claim 17 wherein the control module uses fuzzy logic to determine whether to start or stop the engine.

20. The system of claim 17 wherein the control module uses Boolean logic to determine whether to start or stop the engine.

* * * * *